United States Patent
Koopmans

(10) Patent No.: US 7,357,103 B2
(45) Date of Patent: Apr. 15, 2008

(54) INTERNAL COMBUSTION ENGINE AND METHOD FOR PERFORMING A MODE SWITCH IN SAID ENGINE

(75) Inventor: Lucien Koopmans, Hovås (SE)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 11/374,909

(22) Filed: Mar. 14, 2006

(65) Prior Publication Data

US 2006/0213193 A1 Sep. 28, 2006

(30) Foreign Application Priority Data

Mar. 22, 2005 (EP) .................... 05102278

(51) Int. Cl.
*F02B 1/12* (2006.01)
(52) U.S. Cl. .................... 123/27 R; 123/294; 123/295; 123/435; 123/90.15
(58) Field of Classification Search ............. 123/27 R, 123/294, 295, 305.435, 90.15
See application file for complete search history.

(56) References Cited

FOREIGN PATENT DOCUMENTS

| EP | 0933512 | 10/2002 |
|----|---------|---------|
| EP | 1384875 | 1/2004 |
| EP | 1085192 | 9/2004 |

*Primary Examiner*—Thomas Denion
*Assistant Examiner*—Douglas J. Duff
(74) *Attorney, Agent, or Firm*—Julia Voutyras; Allan J. Lippa

(57) ABSTRACT

The invention relates to an internal combustion engine provided with at least one cylinder and comprising a fuel injection system, an intake air charging system for supplying air under pressure to an air intake manifold, a controller for controlling the fuel injection system, a spark ignition system and the intake air charger. The control unit is adapted to switch the engine from a first combustion mode using a higher manifold pressure to a second combustion mode using a lower manifold pressure, and further adapted to control the intake air charging system to cause a surge in the intake air, in order to evacuate the higher manifold pressure. The invention further relates to a method for controlling the internal combustion engine and a vehicle provided with such an internal combustion engine.

14 Claims, 4 Drawing Sheets

INTERNAL COMBUSTION ENGINE AND METHOD FOR PERFORMING A MODE SWITCH IN SAID ENGINE

TECHNICAL FIELD

The invention relates to a method and a system for controlling a internal combustion engine equipped with an intake air charging system, and more particularly evacuating the excess air generated in the manifold when switching from a combustion mode using a higher manifold pressure, such as charged or boosted, to a combustion mode using a lower manifold pressure, such as ambient or throttled.

BACKGROUND AND SUMMARY OF THE INVENTION

To improve thermal efficiency of gasoline internal combustion engines, lean burn is known to give enhanced thermal efficiency by reducing pumping losses and increasing ratio of specific heats. Generally speaking, lean burn is known to give low fuel consumption and low nitrous oxide, or NOx emissions. There is however a limit at which an engine can be operated with a lean air/fuel mixture because of misfire and combustion instability as a result of a slow burn. Known methods to extend the lean limit include improving ignitability of the mixture by enhancing the fuel preparation, for example using atomised fuel or vaporized fuel, and increasing the flame speed by introducing charge motion and turbulence in the air/fuel mixture. Finally, combustion by auto-ignition, or homogeneous charge compression ignition, has been proposed for operating an engine with very lean or diluted air/fuel mixtures. A lean air/fuel mixture has a lambda value of $\lambda > 1$. By definition, a lambda value $\lambda$ less than 1 is termed "rich", while a value greater than 1 is termed "lean". The lambda value is defined as the quantity of intake air divided by the theoretical air requirement, where the ideal stoichiometric air/fuel ratio (14.5 parts air and 1 part fuel) has a lambda value of $\lambda = 1$.

When certain conditions are met within a homogeneous charge of lean air/fuel mixture during low load operation, homogeneous charge compression ignition can occur wherein bulk combustion takes place initiated simultaneously from many ignition sites within the charge, resulting in very stable power output, very clean combustion and high fuel conversion efficiency. NOx emission produced in controlled homogeneous charge compression ignition combustion is extremely low in comparison with spark ignition (SI) combustion based on propagating flame front and homogeneous charge compression ignition (HCCI) combustion based on an attached diffusion flame. In the latter two cases represented by spark ignition engine and diesel engine, respectively, the burnt gas temperature is highly homogeneous within the charge with very high local temperature values creating high NOx emission. By contrast, in controlled homogeneous charge compression ignition combustion where the combustion is uniformly distributed throughout the charge from many ignition sites, the burnt gas temperature is substantially homogeneous with much lower local temperature values resulting in very low NOx emission.

Engines operating under controlled homogeneous charge compression ignition (HCCI) combustion have already been successfully demonstrated in two-stroke gasoline engines using a conventional compression ratio. The high proportion of burnt gases remaining from the previous cycle, i.e., the residual content, within the two-stroke engine combustion chamber is responsible for providing the hot charge temperature and active fuel radicals necessary to promote homogeneous charge compression ignition in a very lean air/fuel mixture. In four-stroke engines, because the residual content is low, homogeneous charge compression ignition is more difficult to achieve, but can be induced by heating the intake air to a high temperature or by significantly increasing the compression ratio. This effect can also be achieved by retaining a part of the hot exhaust gas, or residuals, by controlling the timing of the intake and exhaust valves.

In all the above cases, the range of engine speeds and loads in which controlled homogeneous charge compression ignition combustion can be achieved is relatively narrow. The fuel used also has a significant effect on the operating range; for example, diesel and methanol fuels have wider auto-ignition ranges than gasoline fuel. A further problem is to achieve ignition at a particular time with maintained combustion stability, while avoiding engine knocking and misfiring. This is a particular problem when operating the engine under HCCI combustion at relatively high load in a region where a mode switch from HCCI to SI may be required.

In order to extend the operating range of an engine operated in HCCI-mode the intake pressure can be boosted by means of a turbocharger or a compressor. This allows the operating range, or operational window, to be extended. However, when switching between a combustion mode using a higher manifold pressure (charged or boosted) to a combustion mode using a lower manifold pressure (ambient or throttled), a problem arises in evacuating the excess air in the manifold in a very short time. In normal SI-mode the engine operates at or near a lambda value of $\lambda = 1$ and a leaner combustion, as used in HCCI-mode, could give problems in combustion stability and or exhaust after treatment e.g. NOx emissions. Secondly, a mode change should occur as fast as possible in order to avoid intermediate combustion modes that are difficult to control.

The problem of evacuating the excess air in the manifold when switching between operating modes also occurs when switching from stratified to homogenous combustion when operating an engine in SI-mode.

Hence, the inventors recognized a need for solving the problem of controlling a supercharged engine and evacuating the excess air in the manifold when switching from a combustion mode using a higher manifold pressure, such as charged or boosted, to a combustion mode using a lower manifold pressure, such as ambient or throttled.

Accordingly, the present invention is directed to an automotive system, including: an internal combustion engine, comprising: at least one cylinder; a piston whose compression action causes a mixture of air and fuel within a combustion chamber of said cylinder to be ignited; at least one inlet valve for admitting gas which includes fresh air into said cylinder; at least one exhaust valve for exhausting combusted gases from said cylinder a fuel injection system having at least one fuel injector, through which fuel is injected into said combustion chamber of said cylinder; an intake air charging system for supplying air under pressure to an engine air intake manifold; at least one sensor for measuring an engine operating parameter; and a controller operating said engine in a first combustion mode, said controller subsequently switching engine operation to a second combustion mode wherein manifold pressure in said second combustion mode is lower than manifold pressure in said first combustion mode; and controlling said intake air charging system to cause a temporary airflow reversal thereby equalizing a pressure difference between said intake valve and said exhaust valve.

The present invention relates to an internal combustion engine provided with a system for boosting the manifold absolute pressure (turbocharger, compressor etc.). In addition the engine is preferably, but not necessarily, provided with means for variable valve timing (VVT) and cam profile switching (CPS). Examples of full variable valve systems are e.g. electrical magnetic valve systems and electrical hydraulic valve systems.

Also, although the following examples relate to gasoline fuels, an engine operating according to principles of the invention can be adapted to use most commonly available fuels, such as diesel, kerosene, natural gas, and others.

A reciprocating piston is arranged in each engine cylinder whose compression action causes a mixture of air and gasoline fuel within the combustion chamber to be ignited. Gas exchange is controlled by at least one inlet valve preferably, but not necessarily, provided with variable valve timing per cylinder for admitting a combustible gas, such as air, and at least one exhaust valve preferably, but not necessarily, provided with variable valve timing per cylinder for exhausting combusted gases.

The combustion process is monitored by sensors for measuring engine knocking and combustion stability. The knock sensor can be of the piezoelectric type, which may also be used for continuous monitoring of cylinder pressure. The combustion stability sensor may be an acceleration type sensor, such as a flywheel sensor, or an ion current sensor. Alternatively, both said sensors can be replaced by a single in-cylinder piezoelectric pressure sensor. By processing the output from such a sensor, it is possible to obtain a signal representing engine knock and a signal representing engine stability.

According to one example, the engine is possible to be operated in homogeneous charge compression ignition (HCCI) combustion mode. In the subsequent text, this will be referred to as HCCI-mode or compression ignition mode. This is a combustion mode, different from a conventional spark ignition (SI) combustion mode, used in order to reduce fuel consumption in combination with ultra low NOx emissions. In this mode, a mixture containing fuel, air and combustion residuals is compressed with a compression ratio between 10.5 and 13 to auto ignition. The HCCI combustion has no or a very slow moving flame front, in contradiction to a SI combustion that has a moving flame front. The lack of a flame front reduces temperature and increases the heat release rate, which in turn increases the thermal efficiency of the combustion. The stoichiometric mixture must be diluted with access air and or residuals in order to reduce the heat release rate. This reduces both pumping losses and combustion temperature hence the fuel consumption compared to an SI operated engine. The combustion residuals are captured when operating the engine with a negative valve overlap. Residuals increase the temperature of the mixture so that the auto ignition temperature is reached before piston top dead centre (TDC) and dilute the mixture so that the heat release rate decreases to an acceptable level. By controlling the heat release, cycle-to-cycle variations (COV), noise and knocking combustion can be reduced. The negative valve overlap is achieved when the exhaust valve is closed before piston TDC and the inlet valve is opened after piston TDC in the gas exchange phase of the combustion.

The acquired valve timing for the negative overlap can be achieved by using suitable fully or partially variable valve systems (VVT), and CPS, hence switching from conventional SI valve timing to HCCI valve timing with a shorter the valve opening duration and/or valve lift.

During compression ignition mode, the exhaust valve is arranged to be closed before top dead centre during an exhaust stroke of the piston and the intake valve is arranged to be opened after top dead centre during an induction stroke of the piston, in order achieve a negative valve overlap to retain residual exhaust gas. The control unit may be arranged to control the fuel injection system so as to perform one or more fuel injections depending on the current operating conditions. The general operation of an engine in the HCCI-mode is well known in the art and will not be described in further detail.

A further preferred embodiment of the invention relates to an internal combustion engine, comprising the component parts as described above, provided with at least one cylinder and arranged to be switched between stratified and homogenous combustion in spark ignition mode.

During stratified combustion fuel is injected directly into the cylinder and the stratified, rich mixture is contained near the spark plug where it is ignited. This combustion mode is used for providing an engine that may achieve both the fuel efficiency of a diesel engine and the high output of a conventional petrol engine. The advantage of this stratified operating mode is the reduction in charge cycle losses caused by operation without throttle, or wide open throttle, in part-load conditions. In this case, fuel is the only factor controlling performance. With the homogeneous ($\lambda=1$) operating mode, the fuel is injected during the induction stroke and is mixed with induction air throughout the combustion chamber. This mode can be used across the entire speed/load range. In this case, as with intake manifold injection, performance is controlled by charging and ignition. With the homogeneous lean ($\lambda>1$) operating mode (as with the "homogenous" mode); injection takes place during the induction stroke. The quantity of fuel is, however, less (excess air). As with stratified mode, fuel is also the factor controlling performance in this operating mode.

For both the above embodiments, the invention provides an improved method for evacuating the excess air in the manifold when switching between operating modes. This is achieved by controlling a supercharged engine and evacuating the excess air in the intake manifold when switching from a combustion mode using a higher manifold pressure (charged or boosted) to a combustion mode using a lower manifold pressure (ambient or throttled).

When sensing a load change for the engine load or engine speed that requires a combustion mode switch, the controller switches the engine from said first combustion mode using a higher intake manifold pressure to said second combustion mode using a lower intake manifold pressure, and further controls the intake air charger to cause a surge in the intake air in order to evacuate, or equalize the higher manifold pressure.

The controller is adapted to switch the intake air charger from a part load map to a map corresponding to a higher load map, such as a full load map. By disabling the load map, for instance by disabling the vane function of a variable diffuser vane turbocharger compressor, a surge is initiated. The concept of load maps for air chargers such as compressors will be described in further detail below. As soon as the excess air has been evacuated from the intake air manifold and the pressure has been reduced to ambient or throttled pressure, the surge is interrupted by switching the compressor back to a load map that will not induce surge and opening a wastegate to prevent the pressure from increasing in the intake air manifold. As stated above, the invention is preferably directed to a direct fuel injection (DI) engine, but it may also be used for engines with port injection. In the latter case, it should be ensured that the excess air to be evacuated from the intake air manifold does not contain injected fuel.

In principle, the intake air charger may be any type that is susceptible to surge, whereby air flow is temporarily reversed. The intake air charger used for the invention is preferably, but not necessarily, a variable geometry compressor or a variable turbocharger compressor. Examples of such air charging means may be compressors with variable diffuser vanes, a variable nozzle or with swirl reversal vanes.

The above advantages and other advantages, and features of the present invention will be readily apparent from the following detailed description of the preferred embodiments when taken in connection with the accompanying drawings, and from the claims.

BRIEF DESCRIPTION OF DRAWINGS

In the following text, the invention will be described in detail with reference to the attached drawings. These drawings are used for illustration only and do not in any way limit the scope of the invention. In the drawings.

DESCRIPTION OF PREFERRED EMBODIMENT(S)

Figure 1:
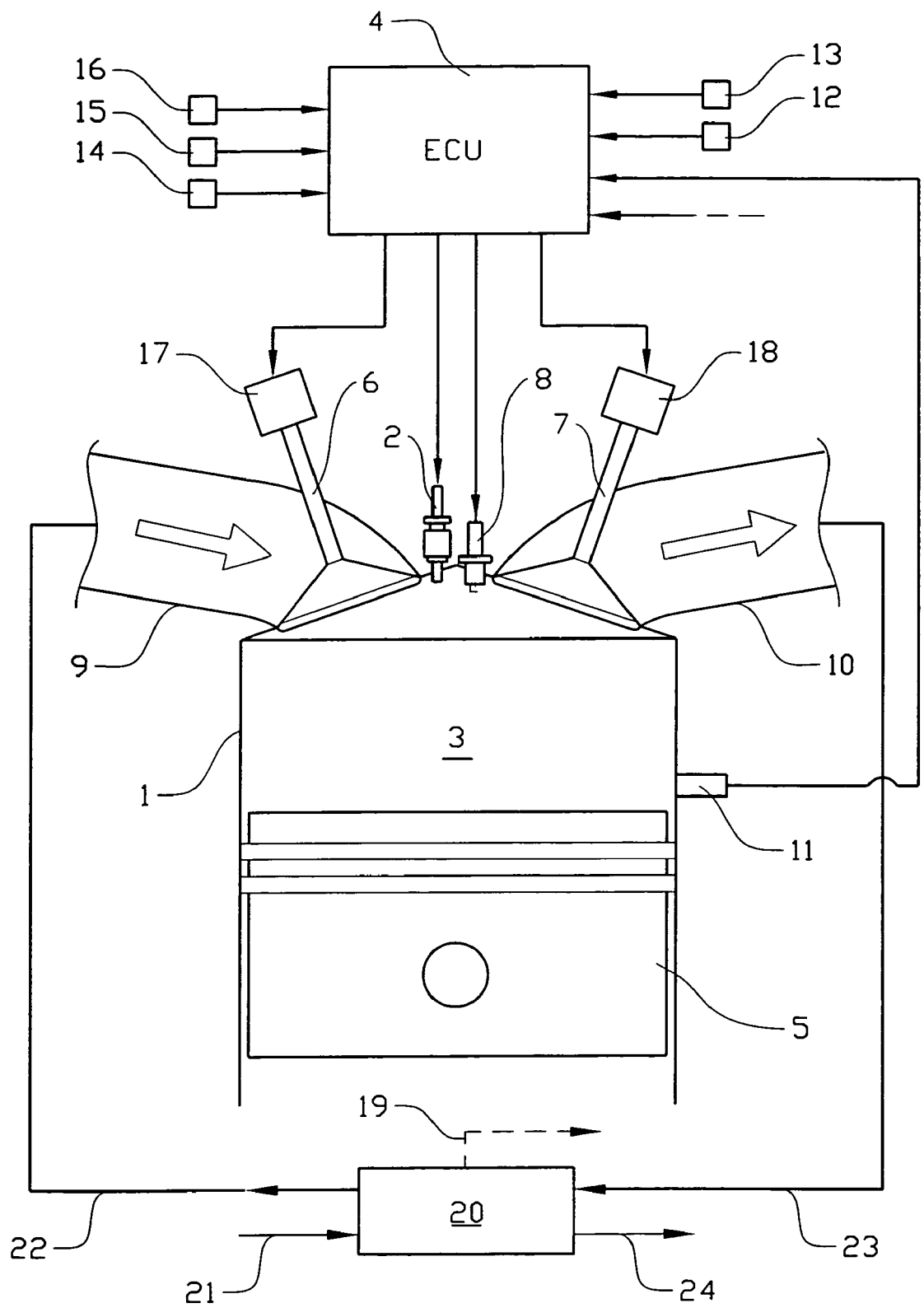
FIG. 1 shows a schematic internal combustion engine according to the invention.

FIG. 1 shows a schematic illustration of an internal combustion engine according to the invention. The engine is provided with at least one cylinder 1 and comprises a fuel injector 2, through which fuel is injected into a combustion chamber 3, for each cylinder. A fuel injection system 4 controls fuel injection quantity per combustion cycle injected through each fuel injector. A piston 5 in the engine cylinder has a compression action that causes a mixture of air and fuel within the combustion chamber to be self-ignited during HCCI-mode or spark ignited during SI-mode. The cylinder is provided with at least one inlet valve 6 for admitting gas which includes fresh air into said cylinder and at least one exhaust valve 7 for exhausting combusted gases from said cylinder. Air is supplied through an intake conduit 9 connected to an intake manifold, while exhaust gas is exhausted through an exhaust conduit 10. During SI-mode, the ignition of the fuel/air mixture is ignited by a spark plug 8.

The controller receives signals from at least one sensor for measuring engine operation parameters, which sensors include a combustion chamber pressure sensor 11, an intake manifold pressure sensor 12 and a λ-probe 13 in the exhaust conduit, as well as temperature sensors for intake air 14, engine coolant 15 and engine oil 16. The controller controls the intake and exhaust valves 6, 7 by means of valve actuators 17, 18. The actuators may be electrically, hydraulically, pneumatically or mechanically operated.

When required, the air supplied through the intake conduit 9 can be pressurised by means of a variable geometry turbocharger 20, in this case comprising a variable vane compressor (not shown). Such turbochargers, comprising a turbine and a compressor impeller, a controllable wastegate and flow controlling, variable diffuser vanes in at least the compressor inlet section are well known in the art, and will not be described in detail here. The turbocharger is controlled by the controller 4 via an electric connection 19. Ambient air is supplied to the turbocharger 20 from a first conduit 21 and delivered to a second conduit at substantially ambient or increased pressure, as and when required by the control unit 4. The second conduit 22 supplies air to the intake conduit 9 via the intake air manifold. Exhaust gas is exhausted from the engine through the exhaust conduit 10 to a third conduit 23 connected to the turbine section of the turbocharger 20. The exhaust gas drives the turbine impeller and is then delivered to an after-treatment unit, such as a catalytic converter, in the vehicle exhaust system (not shown).

Figure 2:
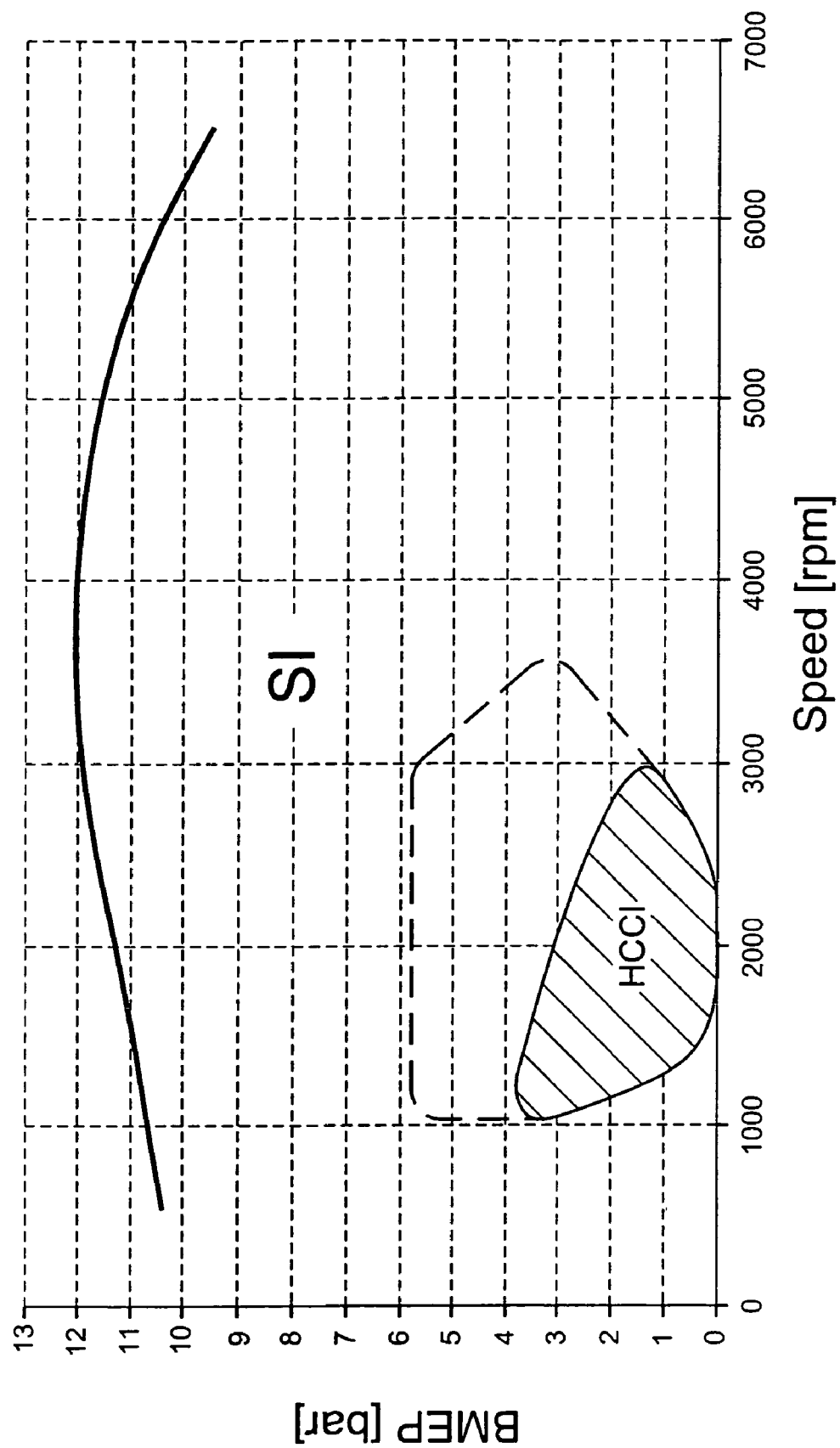
FIG. 2 shows a diagram illustrating the operating range of an engine in SI- and HCCI-mode respectively.

In order to extend the operating range of an engine operated in HCCI-mode the intake air pressure can be boosted by means of the said turbocharger 20. This allows the operating range, or operational window, to be extended as schematically indicated by a dashed line in FIG. 2. However, when switching between a combustion mode using a higher manifold pressure, such as HCCI-mode, to a combustion mode using a lower manifold pressure, such as SI-mode, it is desirable to evacuate the excess air in the intake air manifold in a relatively short time. The time required to equalize the pressure is partially dependent on the size of the compressor, in that a larger compressor will provide a larger cross-sectional flow area for reversed flow. In addition, the magnitude of the pressure difference will also affect said time, although the velocity of the flowing gas during at least an initial phase of the surge is limited by the speed of sound under the current operating conditions. At this flow velocity the compressor is choked and the flow rate can not be increased further. The surge will stop when the pressure upstream and downstream of the compressor has been equalized. This occurs when an engine operated in the turbocharged HCCI-mode is subjected to a load change, such as an increase in engine load or engine speed requiring a switch from part load HCCI mode to full load SI-mode. From FIG. 2 it can be seen that a combustion mode change may in fact be required both by an increase in engine load and by a reduction in engine load, as soon as the operating conditions require the engine to be operated in the SI-mode outside the dashed area indicating HCCI mode FIG. 2.

Figure 3:
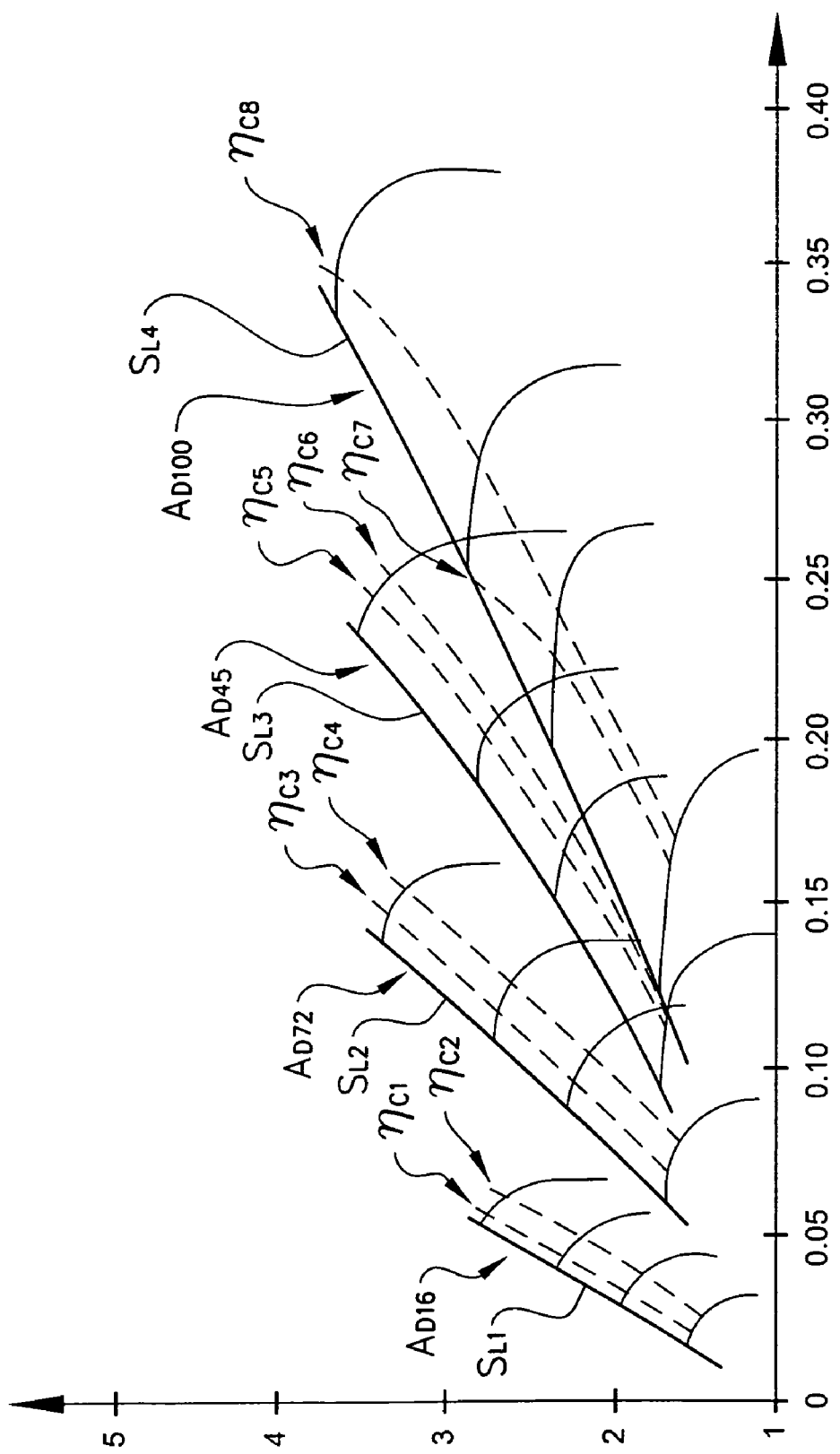
FIG. 3 shows a compressor map for a compressor using a variable vane diffuser.

FIG. 3 shows compressor maps for a compressor using a variable vane diffuser. The figure schematically indicates compressor mappings plotted in a diagram showing pressure ratio over an inlet flow function. The pressure ratio is defined as $P_{OS}/P_{01}$, where $P_{OS}$ is the delivered pressure and $P_{01}$ is the inlet pressure (N/mm$^2$). The (non-dimensional) inlet flow function F is defined as:

$$F = \frac{\dot{m}\sqrt{T_{01}}}{P_{01}A_1}, \text{ where}$$

$\dot{m}$ is the mass flow rate of the gas (kg/s), $T_{01}$ is the inlet temperature of the gas (° C.) and $A_1$ is the inlet area of the compressor (mm$^2$).

According to the example of FIG. 3, used for HCCI operation, the variable vane compressor can be operated using multiple predetermined compressor maps, where each map represents a different diffuser throat area $A_D$ for different degrees of throat area opening (indicated in % of full opening area). For instance, the map represented by the $A_D$ 100% curve $A_{D100}$ shows a compressor map that can be used at full load and the map represented by the $A_D$ 16% curve $A_{D16}$ can be used at a first part load. In the $A_D$ 100% compressor map, in this example also termed "standard compressor map", the variable vane function or the variable swirl function is disabled. The $A_D$ 45% and $A_D$ 72% curves $A_{D45}$, $A_{D72}$ show intermediate part load maps for engine loads between the first part load condition and the full load condition.

For each compressor map the upper line is termed the surge line $S_L$, where the compressor is normally operated below the surge line for each such map. In FIG. 3, the curve $A_{D16}$ has the surge line $S_{L1}$, the curve $A_{D45}$ has the surge line $S_{L2}$, the curve $A_{D72}$ has the surge line $S_{L3}$ and the curve $A_{D100}$ has the surge line $S_{L4}$.

The dashed lines represent lines of constant compressor efficiency $\eta_C$. In the example shown, the dashed lines $\eta_{C1}$ and $\eta_{C2}$ represent compressor efficiencies of 50% and 45% respectively. Similarly, the lines $\eta_{C3}$, $\eta_{C4}$, $\eta_{C5}$, $\eta_{C6}$, $\eta_{C7}$ and $\eta_{C8}$ represent compressor efficiencies of 65%, 60%, 72%, 70%, 80% and 78% respectively.

The curved lines extending downwards from the surge line represent lines of constant, "non-dimensional" rotational speed $C_N$ of the compressor. This rotational speed is expressed as $C_N = U_2/\sqrt{T_{01}}$ and is proportional to the blade tip Mach number, wherein $U_2$ is the rotational speed of the compressor (rpm) and $T_{01}$ is the inlet temperature of the gas (° C.).

According to one example, when operating the engine in charged HCCI mode or stratified direct gasoline injection mode, the compressor is operated with the smallest compressor map AD 16% (described above) enabled using either the variable vane or the variable swirl mechanism, depending on the type of variable compressor used. This compressor map is situated above the surge line in the surge area of the full load map of the compressor, i.e. AD 100% in this example. Hence, when the low load map AD 16% is disabled, either by withdrawing the vanes in the diffuser or switching off the intake swirl, the compressor will surge. This creates a reverse flow through the compressor that will equalize the pressure difference between inlet and outlet in a relatively short period of time. The surge will stop when the pressure upstream and downstream of the compressor has been equalized.

During a mode switch, the surge function can be enabled almost instantly by disabling the low load compressor map and switching the compressor to a higher load map, causing the compressor to surge. Depending on the operating conditions and the type of compressor, the load map may be switched from a low load map, such as AD 16%, to a higher load map or a full load map, such as AD 72% or AD 100%. Because the pressure is levelled out in a very short period of time the occurrence of intermediate combustion modes are limited. This solution can of course be combined with a pressure release valve (or a wastegate) that releases excess pressure to the engine exhaust system or the ambient atmosphere.

One example of a variable compressor that can enable or disable a compressor map using an ON/OFF function can be found in SAE paper 200301-0051, describing this function for a variable vane diffuser.

Figure 4:
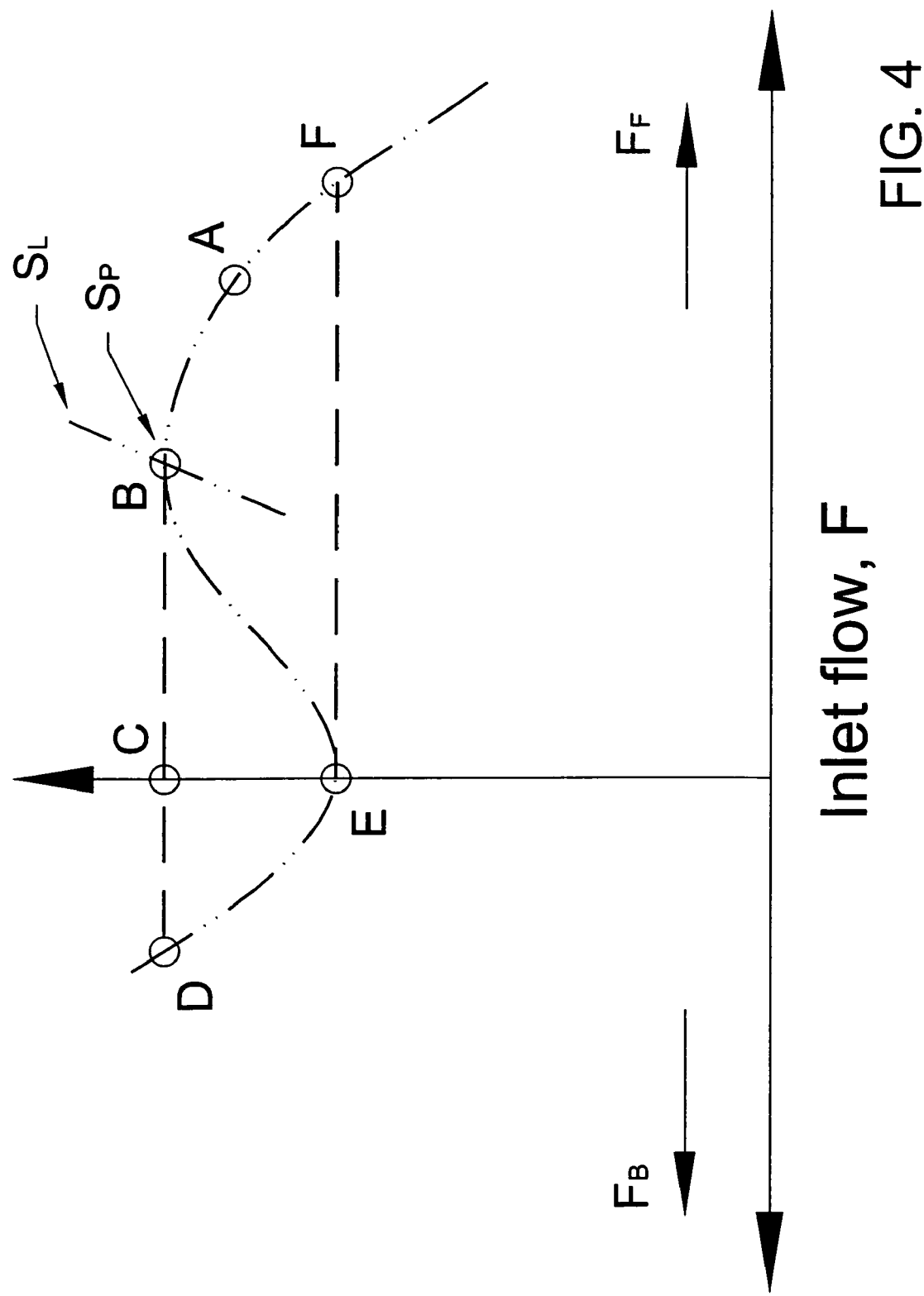
FIG. 4 shows a schematic characteristic curve for a compressor.

FIG. 4 shows a schematic diagram representing a characteristic curve for a turbo compressor, as determined by speed, inlet temperature and pressure. The compressor comprises a single centrifugal stage. The coupling of the impeller to the load, meaning the gas being compressed against a pressure head, depends on maintaining flow through the impeller. As long as there is appreciable forward flow, the impeller keeps its "grip" on the gas. That is, energy is transferred from the impeller to the gas in the form of increased velocity which is converted to pressure head as the gas slows down again in the diffuser passage. This coupling depends on maintaining some minimal amount of forward flow. In FIG. 4, forward and backward flow is indicated by FF and FB, respectively.

Now suppose downstream demand is progressively reduced. The head increases to the maximum achievable by the compressor at that speed, shown as Point B. This is called the surge point $S_P$. The locus of the surge point for all compressor speeds, above and below the characteristic curve in question, is called the surge line $S_L$. Here the flow has fallen to the minimum that the impeller can handle without losing its grip on the gas. A further decrease in downstream demand no longer results in increased head. Instead, the impeller suddenly loses its effectiveness as a motive element and becomes decoupled from the load. In a matter of a fraction of a second, gas within the impeller stops being impelled forward and begins simply spinning around with the impeller. The effect is similar to an airplane wing stalling. The impeller is no longer functioning as an impeller. As the pipe line gas rapidly coasts to a stop, the operating point falls to zero flow at Point C. Subsequently, gas previously compressed in the volume behind the downstream check valve begins leaking backward through the interstices around the impeller and even through the impeller itself, because the head it can create by centrifugal force alone is considerably lower than that built up by velocity. In the diagram, the beginning of this brief flow reversal is shown as a continuation of the jump past Point C to Point D, lying on a theoretical extension of the normal characteristic curve into negative flow. The extension is shown as a broken line.

Then, within a short time—which may be a second or so—the pressure head bleeds down to the minimum that the decoupled impeller can maintain purely by centrifugal force, at Point E. There, the impeller suddenly picks up the load again, throwing gas forward until the operating point hits Point F on the normal characteristic curve. If line flow is still restricted below the surge point for the given speed, the cycle repeats at regular intervals, typically on the order of one second. The surge will stop when the pressure upstream and downstream of the compressor is equalized.

In the above example, a switch between HCCI-mode and SI-mode is described. However, this method is also applicable to an engine in SI-mode being switched from stratified combustion to homogenous or stoichiometric combustion.

The invention is not limited to the above embodiments, but may be varied freely within the scope of the claims:

The invention claimed is:

1. An automotive system, comprising:
an internal combustion engine, comprising:
   at least one cylinder;
   a piston whose compression action causes a mixture of air and fuel within a combustion chamber of said cylinder to be ignited;
   at least one inlet valve for admitting gas which includes fresh air into said cylinder;
   at least one exhaust valve for exhausting combusted gases from said cylinder;
   a fuel injection system having at least one fuel injector, through which fuel is injected into said combustion chamber of said cylinder;
   an intake air charging system for supplying air under pressure to an engine air intake manifold;

at least one sensor for measuring an engine operating parameter; and a controller operating said engine in a first combustion mode, said controller subsequently switching engine operation to a second combustion mode wherein manifold pressure in said second combustion mode is lower than manifold pressure in said first combustion mode; and controlling said intake air charging system to cause a temporary airflow reversal thereby equalizing a pressure difference between said intake valve and said exhaust valve.

2. An automotive system according to claim 1 wherein said controller is arranged to switch said intake air charging system from a part load map to a map corresponding to a higher load map.

3. An automotive system according to claim 2, wherein said controller is arranged to switch said intake air charging system from a part load map to a full load map.

4. An automotive system according to claim 1, wherein said controller is arranged to switch the engine from said first combustion mode to said second combustion mode in response to a change in engine load or speed.

5. An automotive system according to claim 1, wherein said intake air charging system is a turbocharger compressor.

6. An automotive system according to claim 1, wherein said intake air charging system is a supercharging compressor.

7. An automotive system according to claim 1, wherein said first combustion mode is a homogenous charge compression ignition mode and said second combustion mode spark ignition mode.

8. An automotive system according to claim 1, wherein said first combustion mode is a stratified combustion and said second combustion mode is a homogenous combustion.

9. A method for controlling an internal combustion engine having an intake air charger, comprising:

sensing a load change requiring a combustion mode switch;

switching the engine from a first combustion mode using a higher manifold pressure to a second combustion mode using a lower manifold pressure; and controlling said intake air charger to initiate a surge during said combustion mode switch to evacuate excess air from engine manifold.

10. The method according to claim 9, wherein said surge is accomplished by disabling a part load map.

11. The method according to claim 10, wherein said surge is accomplished by switching the intake air charger from a part load map to a full load map.

12. The method according to claim 9, wherein the air charger is a variable vane compressor.

13. The method according to claim 9, wherein said first combustion mode is a homogenous charge compression ignition mode and said second combustion mode is a spark ignition mode.

14. The method according to claim 9, wherein said first combustion mode is a stratified combustion mode and said second combustion mode is a homogenous combustion mode.

* * * * *